(12) United States Patent
Watt et al.

(10) Patent No.: US 7,760,477 B1
(45) Date of Patent: Jul. 20, 2010

(54) CDM PERFORMANCE OF HIGH SPEED CLK INPUTS

(75) Inventors: Jeffrey T. Watt, Palo Alto, CA (US); Antonio Gallerano, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/868,705

(22) Filed: Oct. 8, 2007

Related U.S. Application Data

(60) Provisional application No. 60/850,304, filed on Oct. 6, 2006.

(51) Int. Cl.
*H02H 9/00* (2006.01)
*H02H 1/00* (2006.01)
(52) U.S. Cl. ....................................... 361/56
(58) Field of Classification Search ............... 361/56
See application file for complete search history.

(56) References Cited

U.S. PATENT DOCUMENTS

| | | | | |
|---|---|---|---|---|
| 5,430,602 A | * | 7/1995 | Chin et al. ............... 361/212 |
| 6,011,420 A | * | 1/2000 | Watt et al. ............... 327/310 |
| 6,621,673 B2 | * | 9/2003 | Lin et al. ............... 361/56 |
| 2004/0141266 A1 | * | 7/2004 | Ker et al. ............... 361/56 |
| 2005/0213271 A1 | * | 9/2005 | Chong et al. ............... 361/56 |
| 2006/0187595 A1 | * | 8/2006 | Botula et al. ............... 361/56 |
| 2007/0201175 A1 | * | 8/2007 | Arai et al. ............... 361/56 |

* cited by examiner

*Primary Examiner*—Ronald W Leja
(74) *Attorney, Agent, or Firm*—Ward & Olivo

(57) ABSTRACT

A conventional ESD protection circuit connects a diode and main clamp between a pad or node to be protected and ground. To preserve high speed operation while improving charge device model (CDM) performance, the invention also connects between pad and ground a small diode in series with a secondary clamp and a small isolation resistance. The isolation resistance is approximately 20 ohms. The secondary clamp can be as small as 30 nm wide. Parallel diodes on the main clamp can be replaced with an N+/p-substrate (native) diode 290 to further reduce capacitance.

6 Claims, 3 Drawing Sheets

CDM PERFORMANCE OF HIGH SPEED CLK INPUTS

CROSS-REFERENCE TO RELATED APPLICATIONS

This application claims benefit of the Oct. 6, 2006 filing date of provisional application Ser. No. 60/850,304, which is incorporated herein by reference.

BACKGROUND OF THE INVENTION

To reduce capacitive loading on conventional electrostatic discharge protection circuits, a diode 10 is employed in series with the main clamp 20 to protect an input buffer 30 connected to pad or node 32 as shown in FIG. 1. Main clamp 20 is an MOS transistor comprising a source 22, a drain 24, a body 26 and a gate 28. Source 22 and body 26 are connected to ground; and drain 24 is connected to the cathode of diode 10. The anode of diode 10 is connected to pad 32. During normal operation, the drain of the main clamp is pulled to Vcc by diode 40 and resistor 45 to avoid forward biasing diode 10. Gate 28 of the main clamp is soft grounded through a transistor 50 to facilitate bipolar triggering. An additional diode 90 is frequently connected between pad 32 and ground with its cathode connected to pad 32 and its anode to ground. Diode 90 is typically formed at the junction between a p+ diffusion region and an n-well. Diode 90 provides for discharge of negative electrostatic events.

While such circuit can be employed in older technologies, where input buffers use relatively thick gate oxides, guaranteeing the survivability of this oxide to ESD events in 65 nm technologies and beyond constitutes a significant challenge. Of particular concern are charge device model (CDM) discharges where dangerous high voltages can appear directly on the gate of the input buffer. Any attempt to increase the size of the series diode and or the mosfet clamp with the intent to decrease such voltage overshoots will inevitably lead to an increase of the capacitive loading on the pad limiting the input bandwidth.

SUMMARY OF THE INVENTION

To preserve high speed operation, an illustrative embodiment of the invention adds to the circuit of FIG. 1 a small diode in series with a secondary clamp and a small isolation resistance. The circuit thus includes a diode and main clamp connected between the pad to be protected and ground and a diode, secondary clamp and isolation resistance connected in series between the pad and ground.

The isolation resistance preferably is approximately 20 ohms. The secondary clamp can be as small as 30 nm wide. Parallel diodes on the main clamp can be replaced with an N+/p-substrate (native) diode to further reduce capacitance.

BRIEF DESCRIPTION OF DRAWING

These and other objects, features and advantages of the invention will be more readily apparent from the following Detailed Description in which.

DETAILED DESCRIPTION

Figure 1:
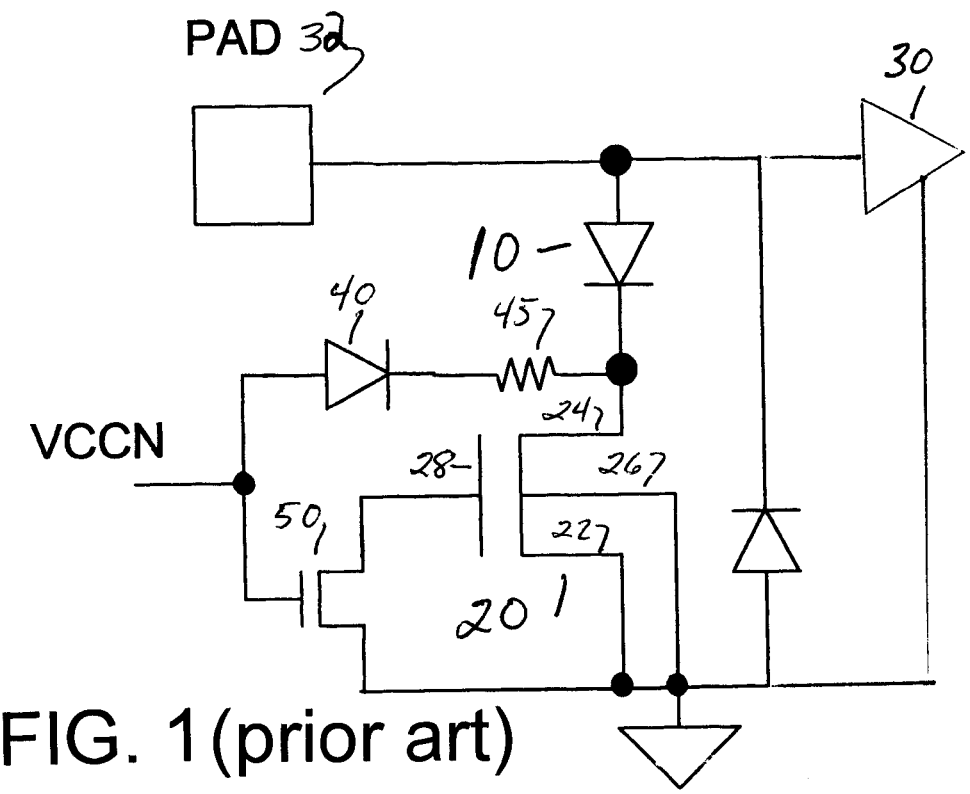
FIG. 1 is a schematic diagram illustrating a prior art ESD circuit.
Figure 2:
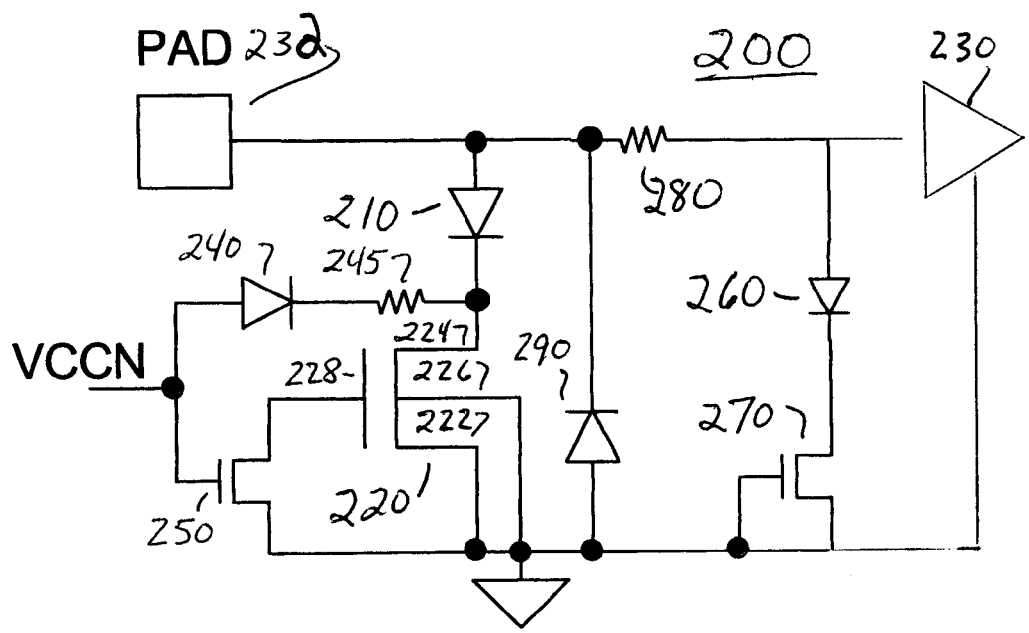
FIG. 2 is a schematic diagram of a first illustrative embodiment of the invention.

FIG. 2 is a schematic diagram of an illustrative embodiment of an ESD circuit 200 of the present invention. Circuit 200 comprises an input buffer 230 connected to a pad or node 232, a diode 210 and main clamp 220 connected between pad or node 232 and ground, and a diode 260, secondary clamp 270 and isolation resistance 280 connected in series between the pad and ground. Main clamp 220 is an MOS transistor comprising a source 222, a drain 224, a body 226 and a gate 228. Source 222 and body 226 are connected to ground; and drain 224 is connected to the cathode of diode 210. The anode of diode 210 is connected to pad 232. Preferably, the drain of the main clamp is pulled to Vcc by diode 240 and resistor 245 to avoid forward biasing diode 210; and gate 228 of the main clamp is soft grounded through a transistor 250 to facilitate bipolar triggering. Preferably another diode 290 is connected between pad 232 and ground with its cathode connected to pad 232 and its anode to ground so as to discharge negative electrostatic events. Advantageously, diode 290 is formed at the junction between an n+ diffusion region and a p-type substrate to reduce the capacitance of this diode.

The isolation resistance 280 is in the range of 20 to 50 ohms and preferably is approximately 20 ohms. Diode 260 can be as small as 12 microns wide, and the secondary clamp 270 can be as small as 30 nm wide. Parallel diodes on the main clamp can be replaced with an N+/p-substrate (native) diode 290 to further reduce capacitance.

Figure 3:
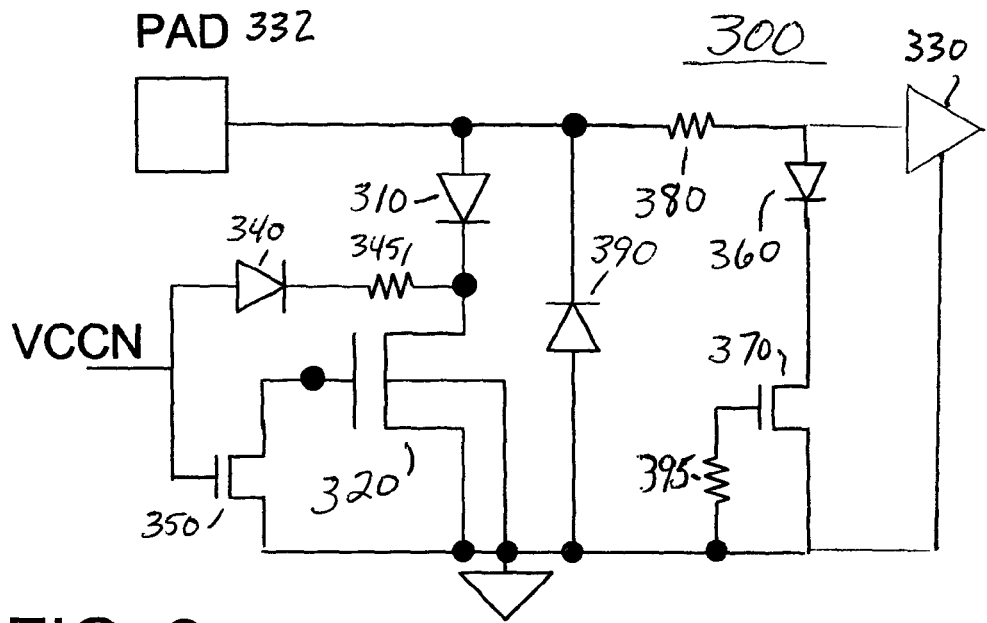
FIG. 3 is a schematic diagram of a second illustrative embodiment of the invention.

FIG. 3 is a schematic diagram of a circuit 300 that is a further improvement on circuit 300. Circuit 300 includes the same elements as circuit 200 with numbers increased by 100. In addition, in circuit 300, a resistor 395 is connected between the gate of the secondary clamp and ground to facilitate triggering. Illustratively, resistor 395 has a resistance in the range of approximately 100 to 1,000 ohms and preferably is approximately 1000 ohms.

Figure 4:
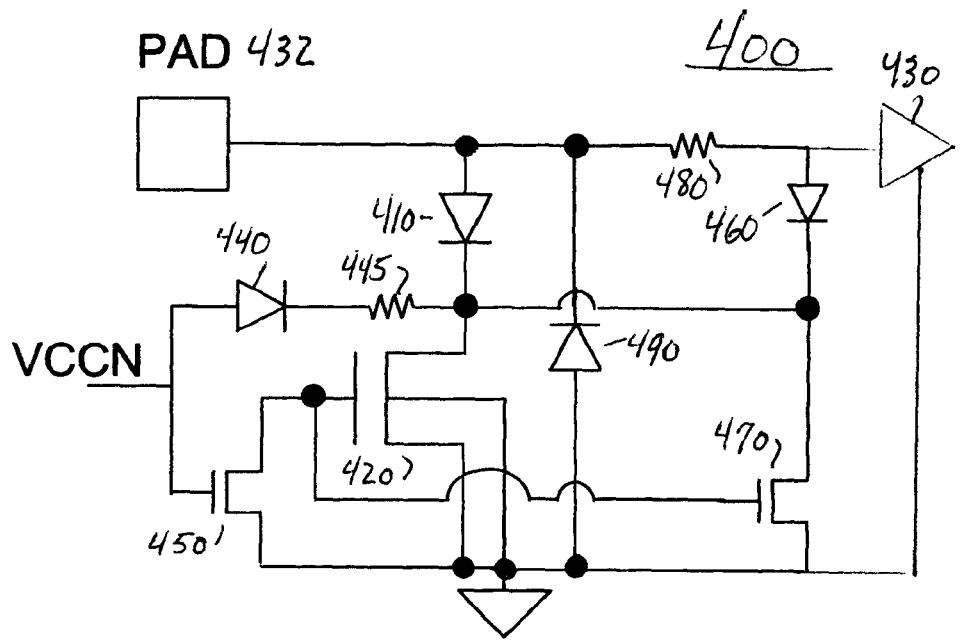
FIG. 4 is a schematic diagram of a third illustrative embodiment of the invention.

Alternatively, the bias scheme employed on the main clamp can be extended to the secondary clamp. FIG. 4 depicts such a circuit. Circuit 400 includes the same elements as circuit 200 with numbers increased by 200. In addition, the gate of secondary clamp 470 is connected to the gate 428 of main clamp 420 so that both gates are soft grounded by transistor 450; and the pull-up circuit of diode 440 and resistor 445 is connected to the anodes of diodes 410 and 460.

Circuit 400 works well only if the connection between the cathode of diode 410 and the cathode of diode 460 is sufficiently resistive. Otherwise, some ESD current might flow from diode 410 to secondary clamp 470. Normally, a sufficiently resistive connection can readily be achieved with an appropriate circuit layout.

Figure 5:
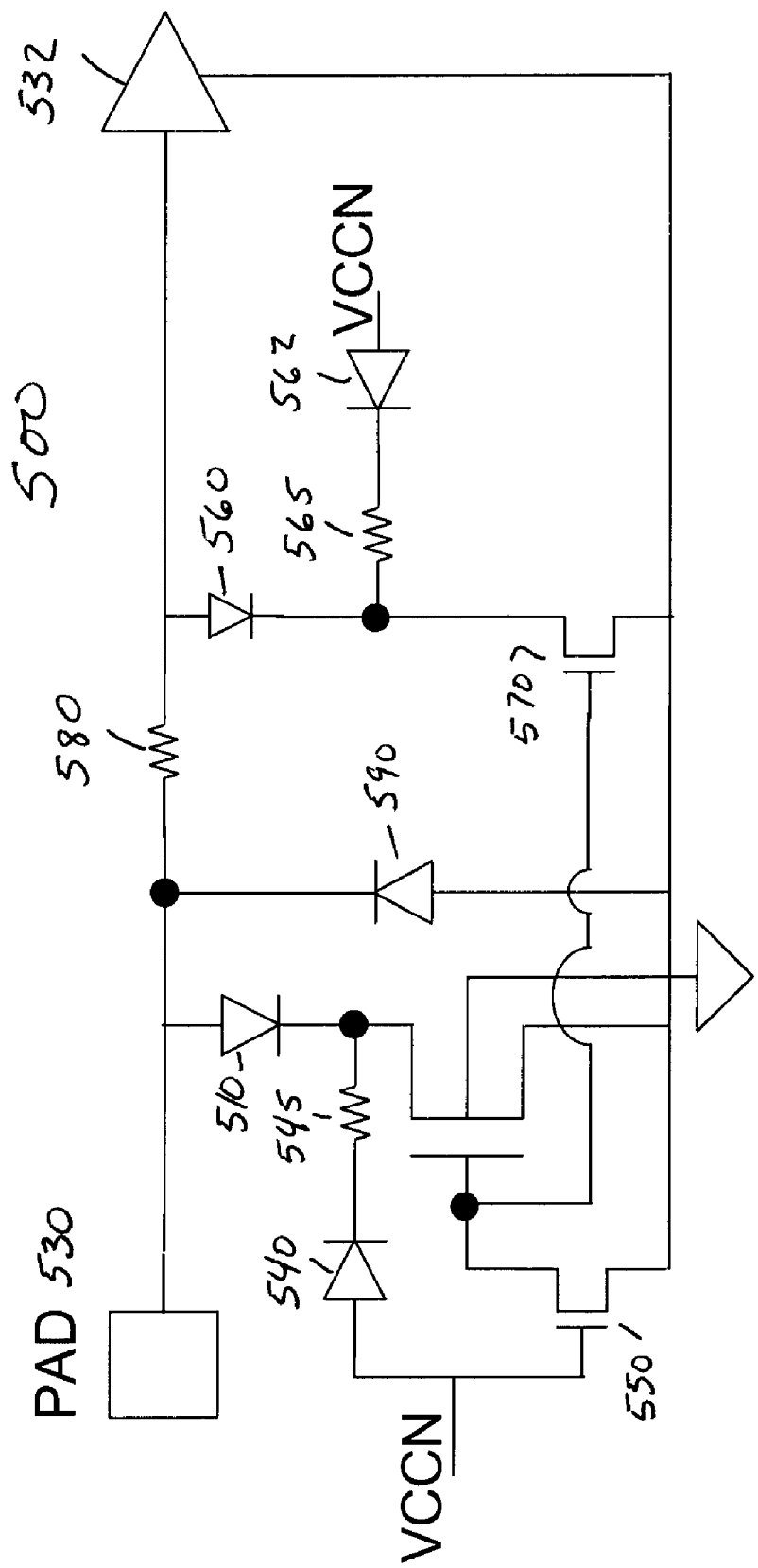
FIG. 5 is a schematic diagram of a fourth illustrative embodiment of the invention.

Alternatively, separate pull-up circuits can be used as shown in circuit 500 of FIG. 5. Circuit 500 includes the same elements as circuit 400 with numbers increased by 100. In addition, a separate pull-up circuit comprising a diode 562 and resistor 565 is connected to the anode of diode 560.

As will be apparent to those skilled in the art, numerous variations may be made in the invention within the spirit and scope of the claims as set forth herein.

What is claimed is:

1. An electrostatic discharge (ESD) protection circuit comprising:

a first diode connected between first and second nodes;

a first transistor connected between the second node and a third node;
a gate of said first transistor being connected to ground though a second transistor;
a fourth node connected to a circuit to be protected;
a first resistance connected between the first node and the fourth node and having a resistance in the range of approximately 20 to 50 Ohms;
a second diode connected between the fourth node and a fifth node; and
a third transistor connected between the fifth node and the third node.

2. The ESD protection circuit of claim 1 wherein a gate of the third transistor is connected to the third node through a second resistance.

3. The ESD protection circuit of claim 2 wherein the second resistance is in the range of approximately 100 to 1000 Ohms.

4. The ESD protection circuit of claim 1 wherein the third node is grounded.

5. The ESD protection circuit of claim 1 wherein the first diode is oriented so that its cathode is connected to the second node and the second diode is oriented so that its cathode is connected to the fifth node.

6. The ESD protection circuit of claim 1 wherein the first resistance has a resistance of approximately 20 Ohms.

* * * * *